United States Patent
Marvi et al.

(10) Patent No.: US 11,828,401 B2
(45) Date of Patent: *Nov. 28, 2023

(54) SYSTEMS AND METHODS FOR AN AMPHIBIOUS SUBMERSIBLE FOR PIPE INTERIOR AND WALL INSPECTION

(71) Applicants: Hamidreza Marvi, Chandler, AZ (US); Borhan Beigzadeh, Chandler, AZ (US); Hosain Bagheri, Phoenix, AZ (US); Tae-woo Lee, Chandler, AZ (US)

(72) Inventors: Hamidreza Marvi, Chandler, AZ (US); Borhan Beigzadeh, Chandler, AZ (US); Hosain Bagheri, Phoenix, AZ (US); Tae-woo Lee, Chandler, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,205

(22) Filed: Nov. 14, 2022

(65) Prior Publication Data
US 2023/0072870 A1 Mar. 9, 2023

Related U.S. Application Data

(63) Continuation of application No. 17/201,616, filed on Mar. 15, 2021, now Pat. No. 11,499,665.

(Continued)

(51) Int. Cl.
*F16L 55/32* (2006.01)
*F16L 55/40* (2006.01)
(Continued)

(52) U.S. Cl.
CPC ............ *F16L 55/32* (2013.01); *B60F 3/0038* (2013.01); *B60F 3/0061* (2013.01); *F16L 55/40* (2013.01); *F16L 2101/30* (2013.01)

(58) Field of Classification Search
CPC ....... F16L 55/32; F16L 55/40; F16L 2101/30; B60F 3/0038; B60F 3/0061; B60F 3/00
See application file for complete search history.

(56) References Cited

U.S. PATENT DOCUMENTS

| 5,416,321 | A | * | 5/1995 | Sebastian | ............... G01N 21/88 250/288 |
| 10,030,803 | B2 | | 7/2018 | Choi et al. | |

(Continued)

OTHER PUBLICATIONS

Kakogawa, et al., Design of a multilink-articulated wheeled pipeline inspection robot using only passive elastic joints, Advanced Robotics 32.1 (2018): 37-50.

(Continued)

*Primary Examiner* — Stephen P Avila
(74) *Attorney, Agent, or Firm* — POLSINELLI PC

(57) ABSTRACT

Various embodiments of an amphibious submersible vehicle for use in non-destructive testing of pipe interiors and walls are disclosed herein. In one aspect, the vehicle is operable for amphibious submersible operation such that pipes of various diameters can be inspected under full, partially full, and dry conditions. In another aspect, the vehicle is equipped with a plurality of propellers for travel when fully or partially submerged in water and a plurality of wheels for traveling when in contact with a pipe wall or for traveling over debris. In some embodiments, the vehicle is equipped with a plurality of sensors configured for imaging and navigation which enable the vehicle for pipe inspection and identification of problem areas.

19 Claims, 14 Drawing Sheets
(6 of 14 Drawing Sheet(s) Filed in Color)

Related U.S. Application Data

(60) Provisional application No. 62/989,345, filed on Mar. 13, 2020.

(51) Int. Cl.
*B60F 3/00* (2006.01)
*F16L 101/30* (2006.01)

(56) References Cited

U.S. PATENT DOCUMENTS

| | | | |
|---|---|---|---|
| 11,499,665 B2* | 11/2022 | Marvi | F16L 55/30 |
| 2002/0083880 A1* | 7/2002 | Shelton | H01F 38/14 |
| | | | 114/312 |
| 2007/0276552 A1* | 11/2007 | Rodocker | B62D 57/00 |
| | | | 701/2 |
| 2012/0215348 A1* | 8/2012 | Skrinde | B25J 9/163 |
| | | | 701/2 |
| 2013/0024067 A1* | 1/2013 | Troy | B64F 5/30 |
| | | | 180/69.6 |
| 2015/0240984 A1* | 8/2015 | Choi | F16L 55/32 |
| | | | 348/84 |
| 2017/0009930 A1* | 1/2017 | Larink | B08B 9/055 |
| 2017/0081834 A1* | 3/2017 | Benedid | E03F 9/002 |

OTHER PUBLICATIONS

Kim, Ho Moon et al., Novel mechanism for in-pipe robot based on a multiaxial differential gear mechanism, IEEE/ASME Transactions on Mechatronics 22.1 (2016): 227-235.

Kown, et al., Design and motion planning of a two-module collaborative indoor pipeline inspection robot, IEEE Transactions on Robotics 28.3 (2012): 681-696.

Mirats Tur, et al., Robotic devices for water main in-pipe inspection: A survey, Journal of Field Robotics 27.4 (2010): 491-508.

\* cited by examiner

__US 11,828,401 B2__

SYSTEMS AND METHODS FOR AN AMPHIBIOUS SUBMERSIBLE FOR PIPE INTERIOR AND WALL INSPECTION

CROSS REFERENCE TO RELATED APPLICATIONS

This is a continuation patent application of U.S. Non-Provisional application Ser. No. 17/201,616 filed on 15 Mar. 2021, now U.S. Pat. No. 11,499,665, that claims benefit to U.S. Provisional Patent Application Ser. No. 62/989,345 filed 13 Mar. 2020, which is herein incorporated by reference in its entirety.

FIELD

The present disclosure generally relates to non-destructive testing; and in particular, to a system and method for a self-navigating amphibious submersible for non-destructive testing of pipe interior and walls.

BACKGROUND

Utility pipe cleaning can cost up to $400,000 per 10 mile segment, with workers scouring miles-long stretches of pipe to remove debris and identify problem areas. In some segments, a cleaning hose (~850 ft.) may not reach certain areas such as a center of pipe sections. In addition, inspection of pipe structures is a vital task for maintaining the health of a water system's infrastructure; however, this can also be a dangerous task which can be difficult to complete. Thus, it makes sense to identify problem areas in the pipe and focus resources to these areas.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figure 1:
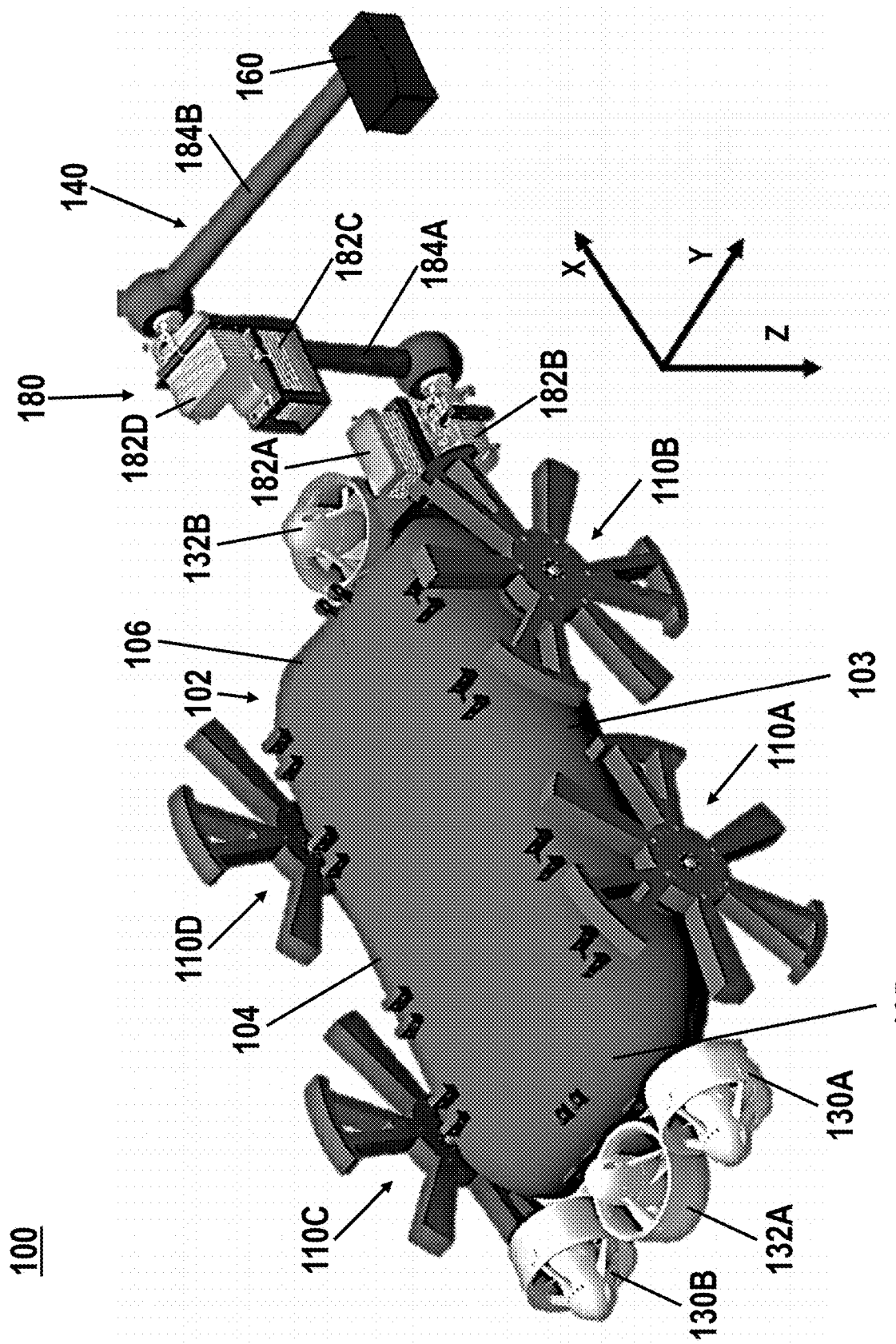
FIG. 1 is a perspective view showing an amphibious submersible.

Various embodiments of a self-navigating and self-extricating amphibious submersible vehicle with visual, sonar and laser sensing capabilities are described herein. In one aspect, the vehicle is operable for amphibious submersible operation such that pipes of various diameters can be inspected under full, partially full, and dry conditions. In another aspect, the vehicle is equipped with a plurality of propellers for navigation when fully or partially submerged in water and a plurality of wheels for traveling when in contact with a pipe substrate or for traveling over debris within the pipe. In some embodiments, the vehicle is equipped with a plurality of sensors operable for imaging and navigation which enable the vehicle for pipe inspection and identification of problem areas. In one embodiment, the sensors include visual, sonar and laser sensors which are operable for determining the location, amount and nature of debris, while sonar and laser probing operations can provide information about wall deposits and pipe wall conditions. Following sensor inspections by the vehicle, targeted cleaning strategies and technologies can be developed. Referring to the drawings, embodiments of an amphibious submersible, referred to herein as "the vehicle", are illustrated and generally indicated as 100 in FIGS. 1-11.

FIG. 1 illustrates a vehicle 100 that provides an amphibious mobility platform to travel through a utility pipe 10 (FIG. 4), where an inspection of the utility pipe 10 can be performed by a plurality of sensors 160 located onboard the vehicle 100. The vehicle 100 is operable to navigate through pipes which may have various obstacles therein, such as bumps, boulders, and debris under fully filled, partially filled or dry conditions within the interior of the utility pipe 10. In embodiments, the vehicle 100 includes an elongated body 102 defining a first side 103, a second side 104, a front side 105 and a rear side 106. A plurality of wheels 110A-D are engaged along respective first and second sides 103 and 104 of the elongated body 102. The plurality of wheels 110A-D of the vehicle 100 are operable for performing amphibious and terrain maneuvers during submersible operations. Each wheel 110A-D includes a plurality of spokes 112 that extend laterally from the center of each wheel 110A-D, as shown in FIG. 1. The vehicle 100 further includes a set of horizontally oriented propellers 130A and 130B for forward or backward propulsion when in water, as well as a set of vertically oriented propellers 132A and 132B for upward or downward propulsion of the vehicle 100 in water. In addition, the vehicle 100 includes a robotic arm 140 having a sensor array 160 positioned at a distal end of the robotic arm 140 for imaging and navigation through the pipe 10. The motors controlling the wheels 110, the horizontal and vertical propellers 130A, 130B, 132A and 132B, and the robotic arm 140 are controlled or otherwise operated by a controller 170 (FIG. 2).

Wheels

Figure 2:
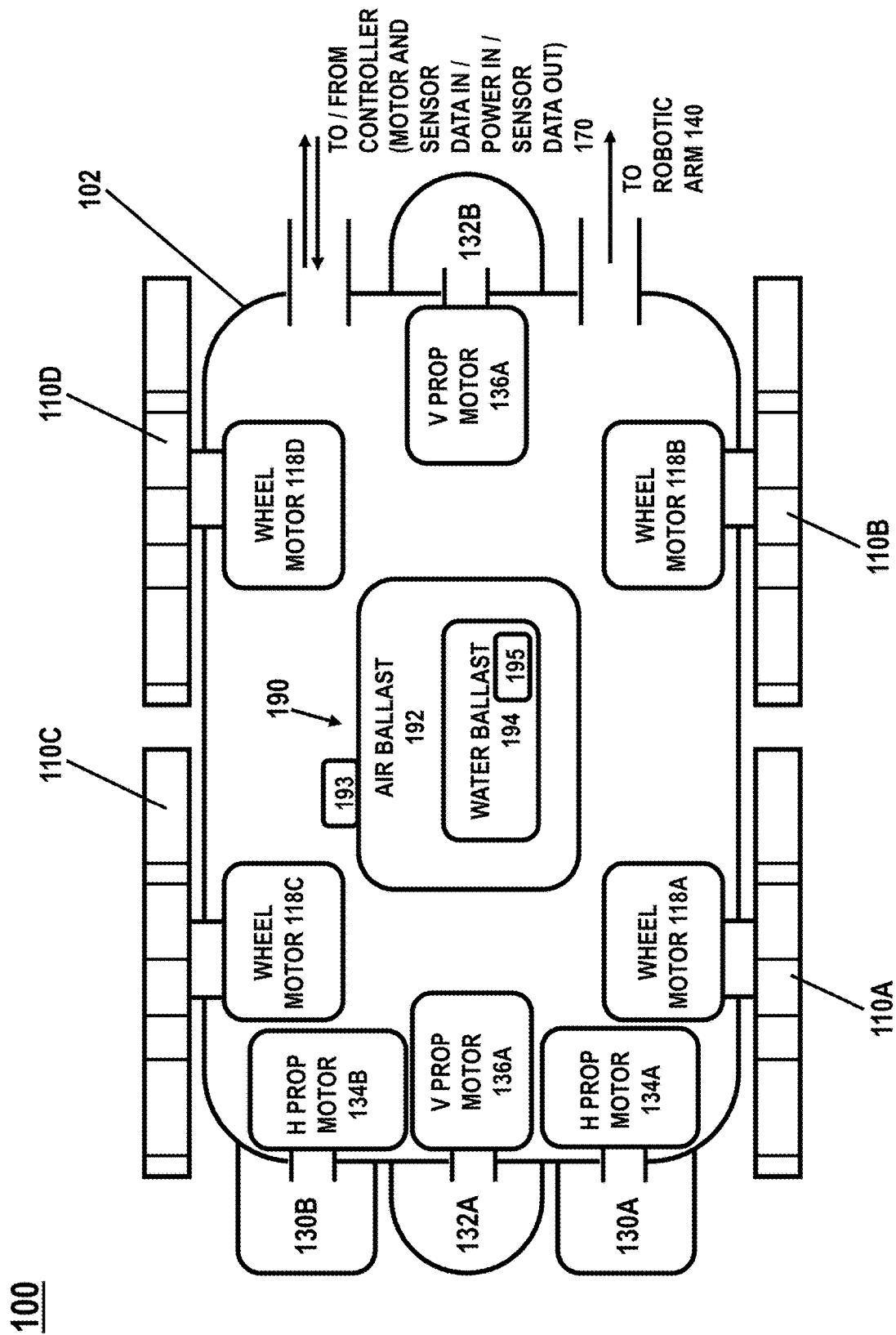
FIG. 2 is a simplified illustration showing internal components of the amphibious submersible of FIG. 1.
Figure 3:
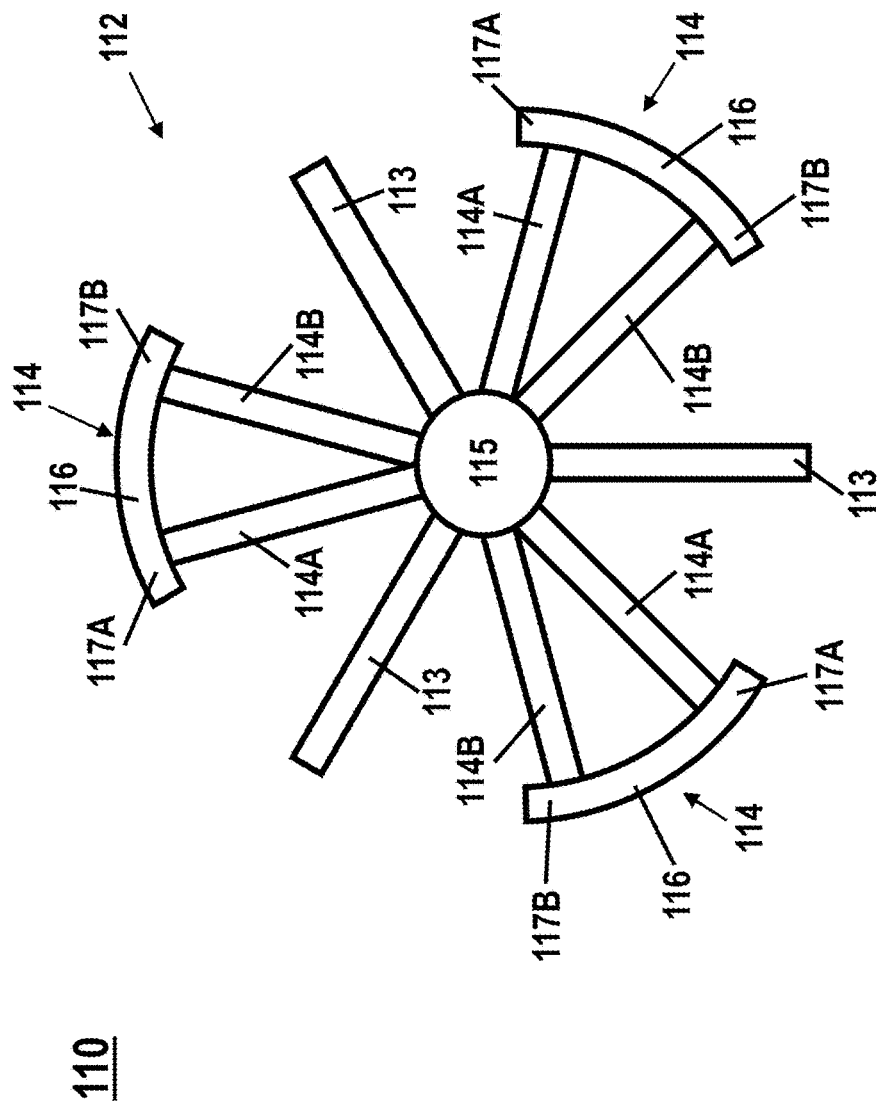
FIG. 3 is a side view showing a wheel of the amphibious submersible of FIG. 1.

Referring to FIGS. 1-3, in some embodiments, each wheel 110A-D is powered by a respective wheel motor 118A-118D (FIG. 2) for performing amphibious operations and to overcome slippery, granular or otherwise uneven terrain such as pipe blockages during navigation. For example, one suitable motor is a 12V planetary gear motor capable of a maximum speed of 45 rpm and stall torque of 153 kgf-cm. In one embodiment, the spokes 112 of wheels 110A-D are interchangeable, thereby allowing variability between the number of spokes 112 used to reconfigure the shape of the wheel 110 as needed. While traditional wheels are effective on flat and solid surfaces, the spokes 112 of each respective wheel 110A-D allow for greater traction and maneuverability with less slippage. In one embodiment, the wheels 110 are used when the vehicle 100 is on land (e.g. granular, gravel, and rocky mediums) and wetland (e.g. saturated and muddy environments).

One embodiment of a wheel 110 is illustrated in FIG. 3. As shown, each wheel 110 includes a plurality of spokes 112 extending outwardly from a hub 115 of each wheel 110. In this embodiment, each spoke 112 can embody a single member 113 or an anchored member 114. In particular, single members 113 and anchor members 114 are arranged in an alternating fashion; however, it should be noted that such a configuration is not fixed and that any combination of single members 113 and anchor members 114 is contemplated. Anchor members 114 each include a first prong 114A and a second prong 114B, wherein the first prong 114A and the second prong 114B are joined together by a rocker 116 positioned at a distal end of the first prong 114A and a distal end of the second prong 114B. In some embodiments, the rocker 116 defines a first claw 117A and a second claw 117B, each extending past respective junctions with the first prong 114A and the second prong 114B. During conditions in which the vehicle 100 would need to "drive" on land or saturated ground such as in FIGS. 4-6, the first and second claws 117A and 117B of the rocker 116 allow the vehicle 100 to anchor itself into the ground and propel itself forward or backward as the wheel 110 is rotated by its associated motor 118. This arrangement also enables the vehicle 100 to climb slight grades on uneven terrain. The arc portion of the rocker 116 allows the vehicle 100 to more easily shift its weight as the vehicle 100 moves either forward or backward.

Referring to FIG. 2, wheel motors 118A-D are each associated with a respective wheel 110A-D. In particular, wheel motor 118A is associated with wheel 110A for clockwise or counterclockwise rotation of wheel 110A, wheel motor 118B is associated with wheel 110B for clockwise or counterclockwise rotation of wheel 110B, wheel motor 118C is associated with wheel 110C for clockwise or counterclockwise rotation of wheel 110C, and wheel motor 118D is associated with wheel 110D for clockwise or counterclockwise rotation of wheel 110D. Wheel motors 118A-D are each separately controlled by the controller 170 (FIG. 8) to enable differential steering.

Water Propulsion

As noted above, the vehicle 100 is operable for amphibious and fully submerged operations. For submerged propulsion, the elongated body 102 further includes the set of horizontally oriented propellers 130A and 130B engaged on the front side 105 of the vehicle 100 as shown in FIG. 1. Horizontally oriented propellers 130A and 130B point along horizontal axis X such that rotation of the horizontally oriented propellers 130A and 130B propels the vehicle 100 in a first direction or an opposite second direction along the horizontal axis X. Horizontally oriented propellers 130A and 130B are each associated with a respective horizontally oriented propeller ("H prop") motor 134A and 134B. In particular, H prop motor 134A is associated with horizontally oriented propeller 130A for clockwise or counterclockwise rotation of horizontally oriented propeller 130A, and resultant forward or backward motion of the first side 103 of the vehicle 100. Similarly, H prop motor 134B is associated with the horizontally oriented propeller 130B for clockwise or counterclockwise rotation of horizontally oriented propeller 130B, and the resultant forward or backward motion of the vehicle 100. In some embodiments, H prop motors 134A and 134B are each separately controlled by controller 170 to enable differential steering in water.

For propulsion in the vertical direction while submersed, the elongated body 102 includes the set of vertically oriented propellers 132A and 132B engaged on the front side 105 and the rear side 106 of the vehicle 100 as shown in FIG. 1. Vertically oriented propellers 132A and 132B are oriented to point along axis Z such that clockwise or counterclockwise rotation of the vertically oriented propellers 132A and 132B propels the vehicle 100 in an upward direction or a downward direction along the vertical axis Z. Referring to FIG. 2, vertically oriented propellers 132A and 132B are each associated with a respective vertically oriented propeller ("V prop") motor 136A and 136B operable for producing a vertical force when submerged in water such that the vehicle 100 is lifted or lowered within the pipe 10. In particular, V prop motor 136A is associated with vertically oriented propeller 132A for clockwise or counterclockwise rotation of vertically oriented propeller 132A and resultant upward or downward motion of the front side 105 of the vehicle 100. Similarly, V prop motor 136B is associated with vertically oriented propeller 132B for clockwise or counterclockwise rotation of vertically oriented propeller 132B and resultant upward or downward motion of the rear side 106 of the vehicle 100. In some embodiments, V prop motors 134A and 134B are each separately controlled by controller 170 to enable differential steering in the vertical direction in water. This allows controlled maneuverability in the vertical direction, enabling the vehicle 100 to avoid obstructions within the pipe 10.

Ballast

In some embodiments, the vehicle 100 is operable for variable buoyancy due to ballast system 190, which can include an air ballast tank 192 associated with an air pump 193 for pumping air into the body 102 of the vehicle 100 and increasing its buoyancy relative to the surroundings of the vehicle 100. Similarly, ballast system 190 can also include a water ballast tank 194 associated with a water pump 195 for pumping water into the body 102 of the vehicle 100 and decreasing its buoyancy relative to the surroundings of the vehicle 100. In one aspect, the vehicle 100 largely operates under neutral buoyancy, which allows better control in a 3-D space.

Figure 6:
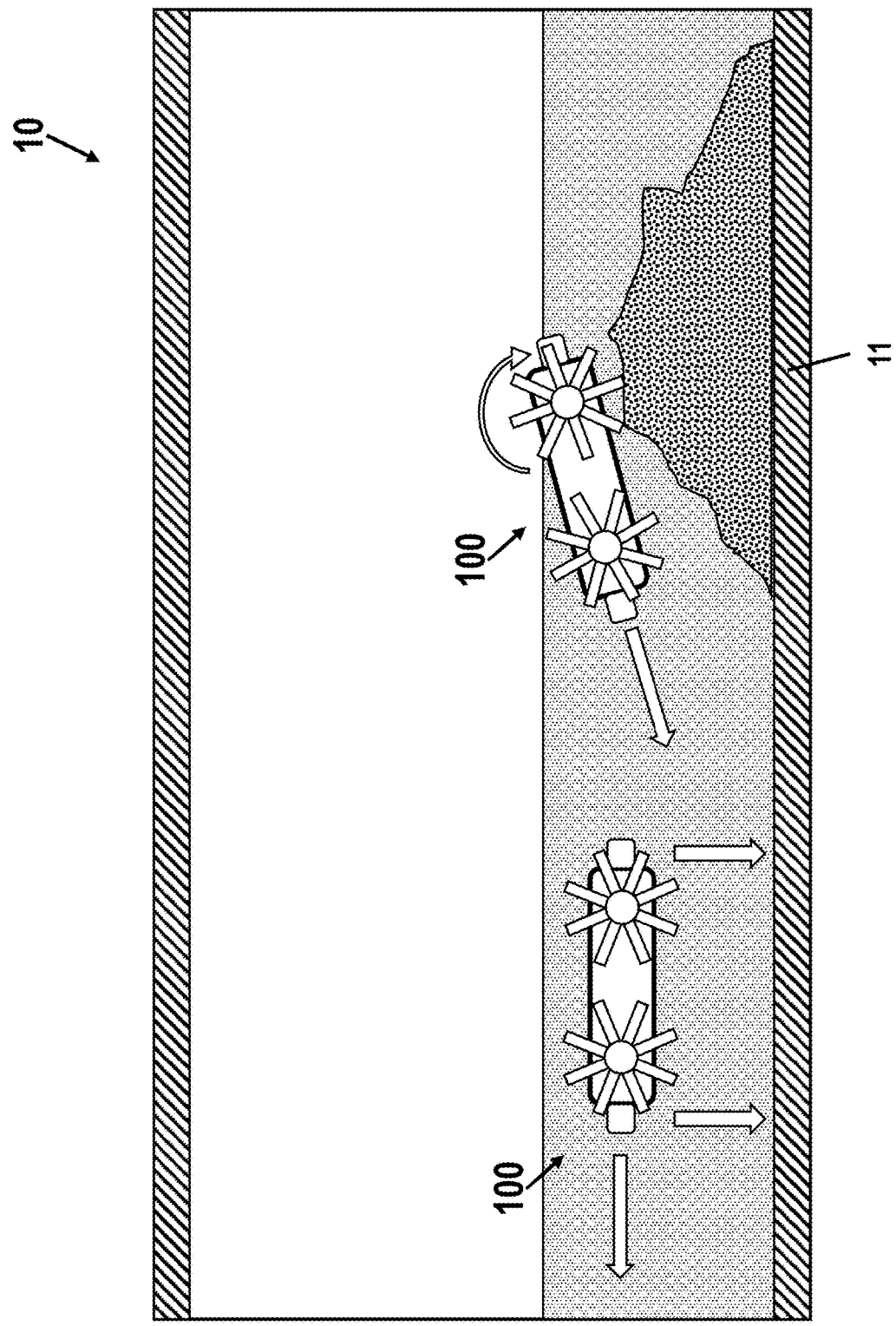
FIG. 6 is an illustration showing the amphibious submersible of FIG. 1 submerged and traveling through the pipe fully filled with water using a first set of propellers and a second set of propellers.
Figure 7:
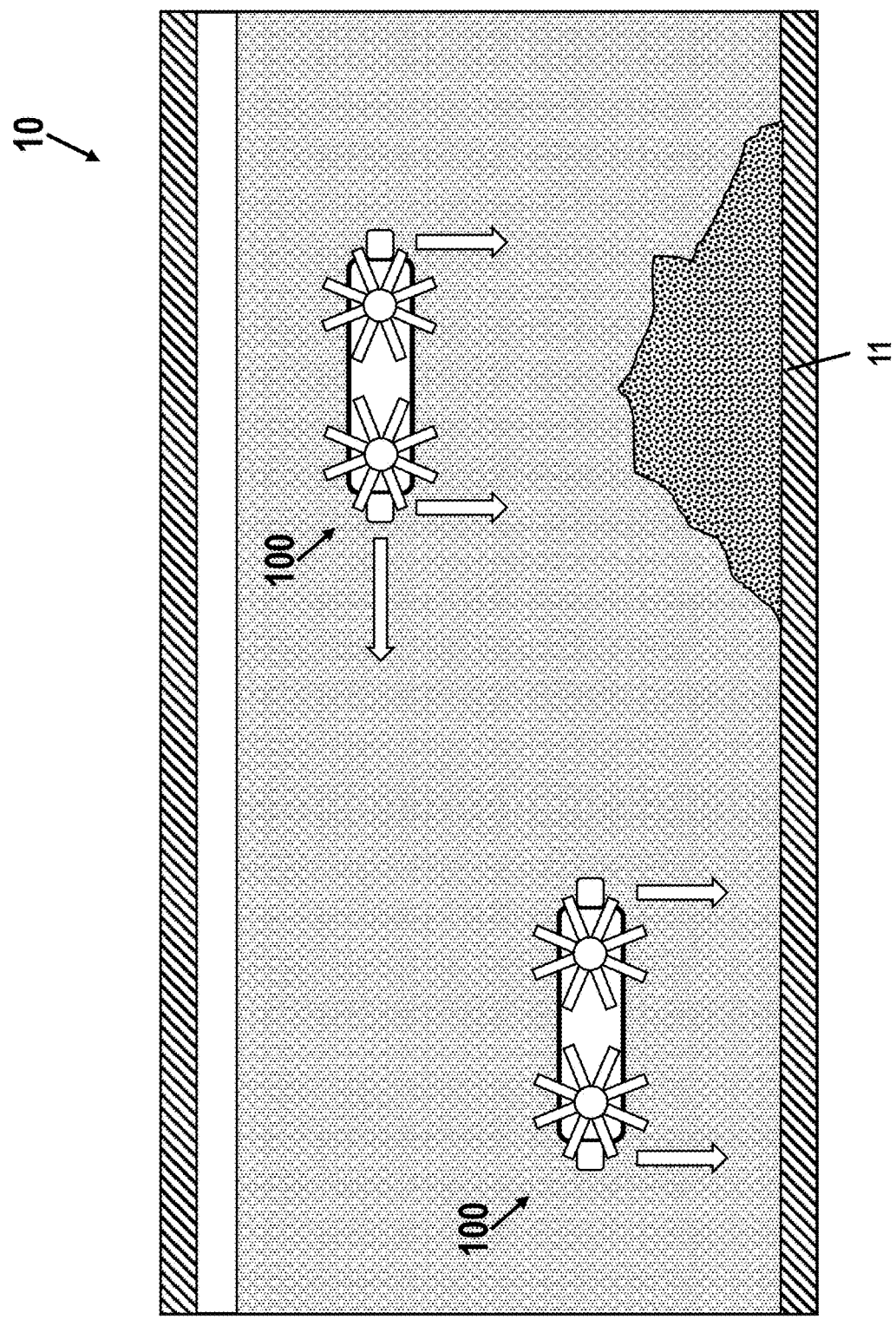
FIG. 7 is an illustration showing the amphibious submersible of FIG. 1 floating in a full pipe such that the amphibious submersible contacts an upper side of the pipe with the propeller and wheels shown in operation.

In a further aspect, three phases are considered for the operation of this mobility platform: (1) wheel operation under dry conditions as shown in FIG. 4, (2) wheel-propeller operation under partially submerged conditions as shown in FIGS. 5 and 6, and (3) full propeller under fully submerged conditions as shown in FIG. 7.

Situational Utility

Figure 4:
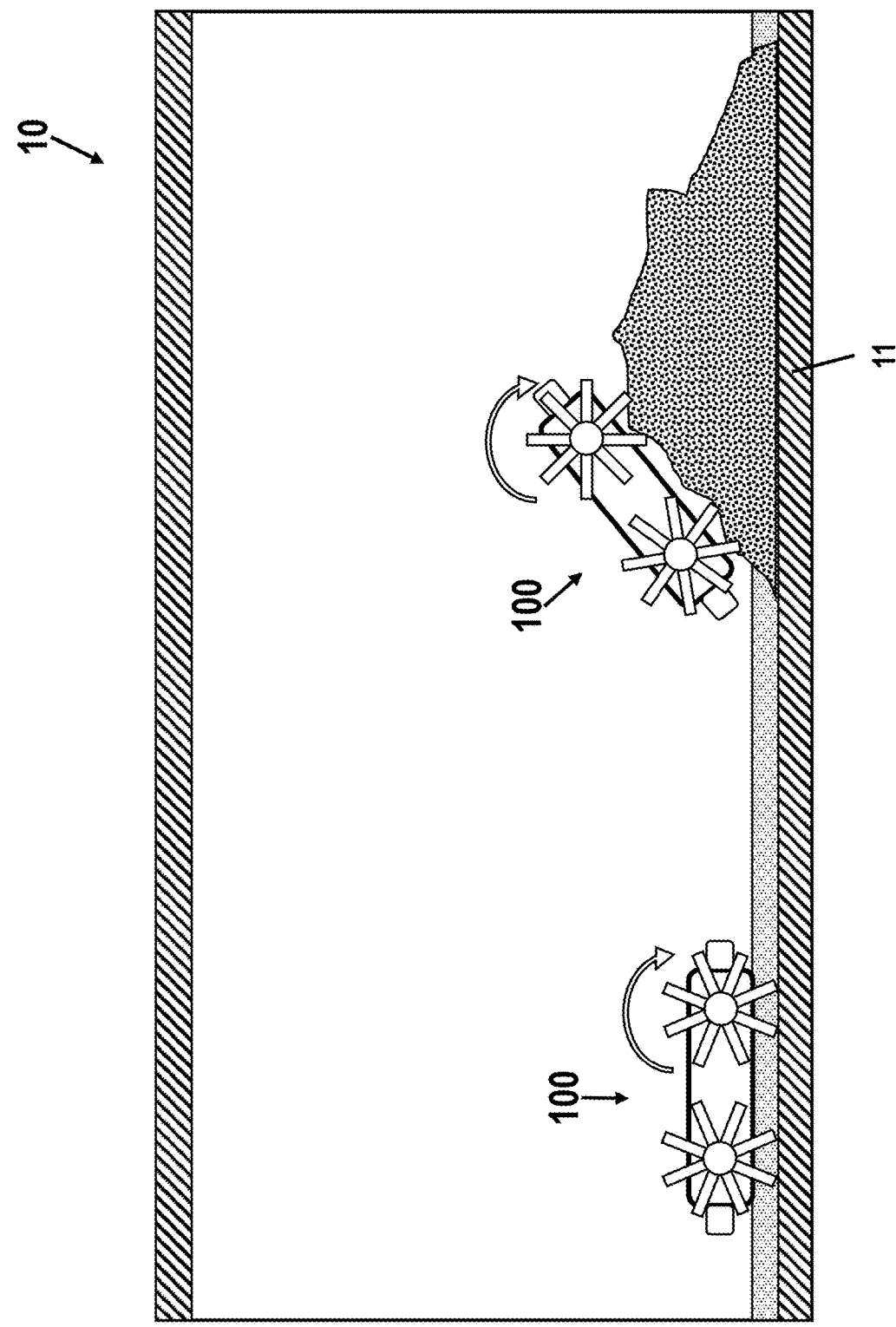
FIG. 4 is an illustration showing the amphibious submersible of FIG. 1 traveling along a bottom of a pipe.

FIG. 4 illustrates a situation in which the level of liquid in the pipe 10 is not so considerable compared to the dimensions of the vehicle 100, and there is enough frictional force between the wheels 110 (FIG. 1) and a substrate 11 of the pipe to let the vehicle 100 operate by simple rotation of the wheels 110A-D and the vehicle 100 to negotiate obstacles properly. As discussed above, the spokes 112 (FIG. 3) of each of wheel 110 provides sufficient traction such that the vehicle 100 can traverse obstacles.

Figure 5:
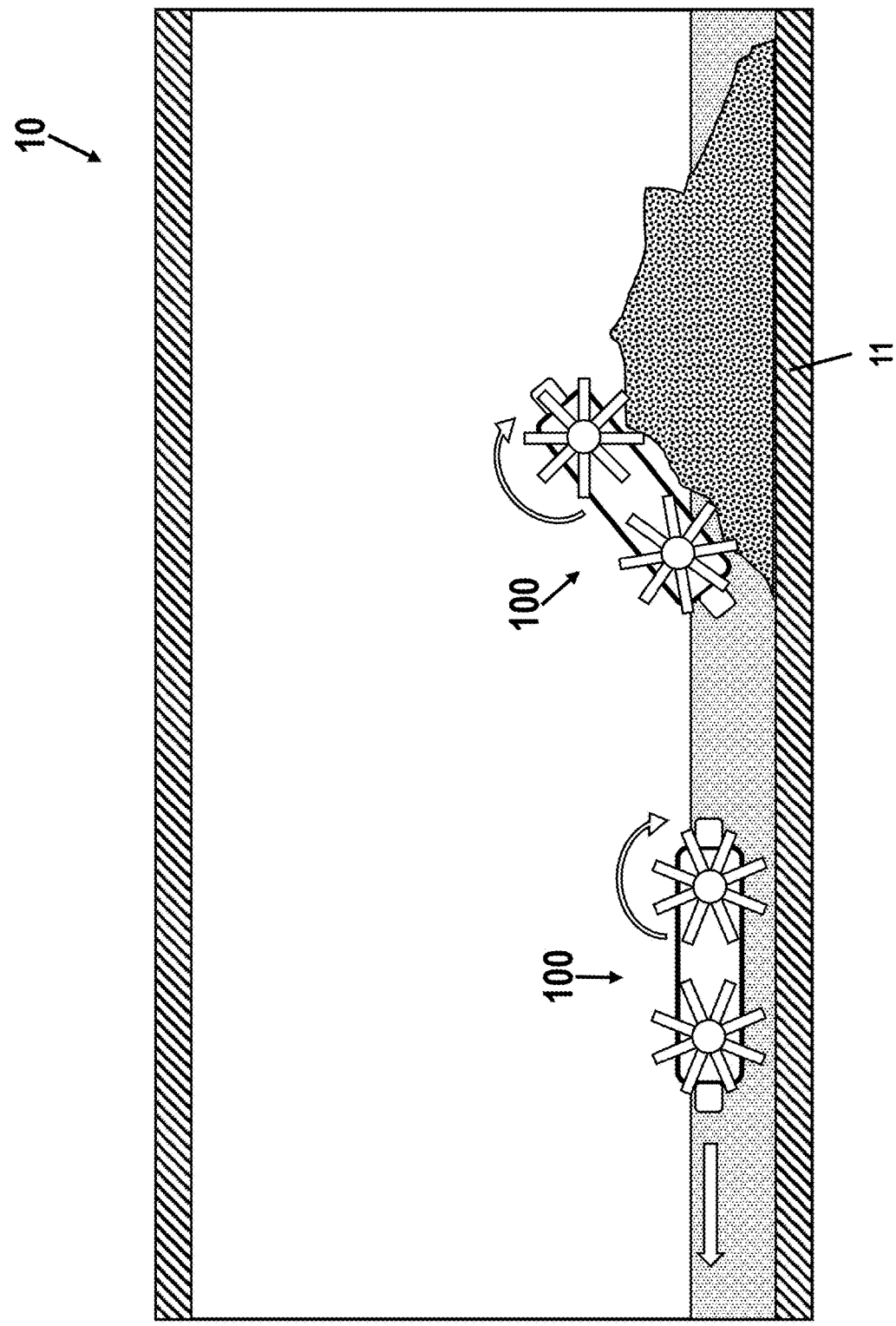
FIG. 5 is an illustration showing the amphibious submersible of FIG. 1 traveling through the pipe half-filled with water using a first set of propellers and a second set of propellers.

Referring to FIG. 5, the second phase corresponds to when the liquid level is slightly higher than shown in FIG. 4 to almost, but not fully, submerge the vehicle 100, although not enough to allow the vehicle 100 to freely move vertically within the pipe. In this case, the wheels 110 may not maintain continual contact with the substrate 11 of the pipe 10, especially if the buoyancy of the vehicle 100 is neutral or slightly less than that of the surrounding liquid. Therefore, the horizontally oriented propellers 130A and 130B (FIG. 1) and the wheels 110A-D (FIG. 1) are active and operational during this phase in order to generate enough driving force to propel the vehicle 100 forward or backward.

Referring to FIG. 6, when the vehicle 100 is fully submerged in the pipe and there is no contact between wheels 110A-D (FIG. 1) and the substrate 11, the horizontally oriented propellers 130A and 130B (FIG. 1) provide the main driving force to propel the vehicle 100. However, if the vehicle 100 encounters obstacles in which the collective force generated by the horizontally oriented propellers 130A and 130B is insufficient to allow the vehicle 100 to pass over those obstacles without contact, the wheels 110A-D of the vehicle 100 would become operational.

Referring to FIG. 7, when the vehicle 100 is fully submerged and encounters obstacles in which the liquid level in the pipe allows the vehicle 100 sufficient room to move vertically, the vertically oriented propellers 132A and 132B (FIG. 1) are actuated to generate a vertical force for lifting the vehicle 100 relative to the substrate 11 of the pipe 10. Horizontally oriented propellers 130A and 130B further propel the vehicle 100 in either a forward or backward direction.

As discussed above, steering of the vehicle 100 in all phases is performed by applying differential drive to the left and right wheels 110. When the wheels 110 are in contact with the substrate 11 of the pipe 10, this method of propulsion is easily applicable. In other cases, when there is no contact between the wheels 110 and the pipe 10, differential rotation is applied to the horizontally or vertically oriented propellers 130A, 130B, 132A, and 132B to manipulate a position of the vehicle 100 in 3-D space.

Controller

Figure 8:
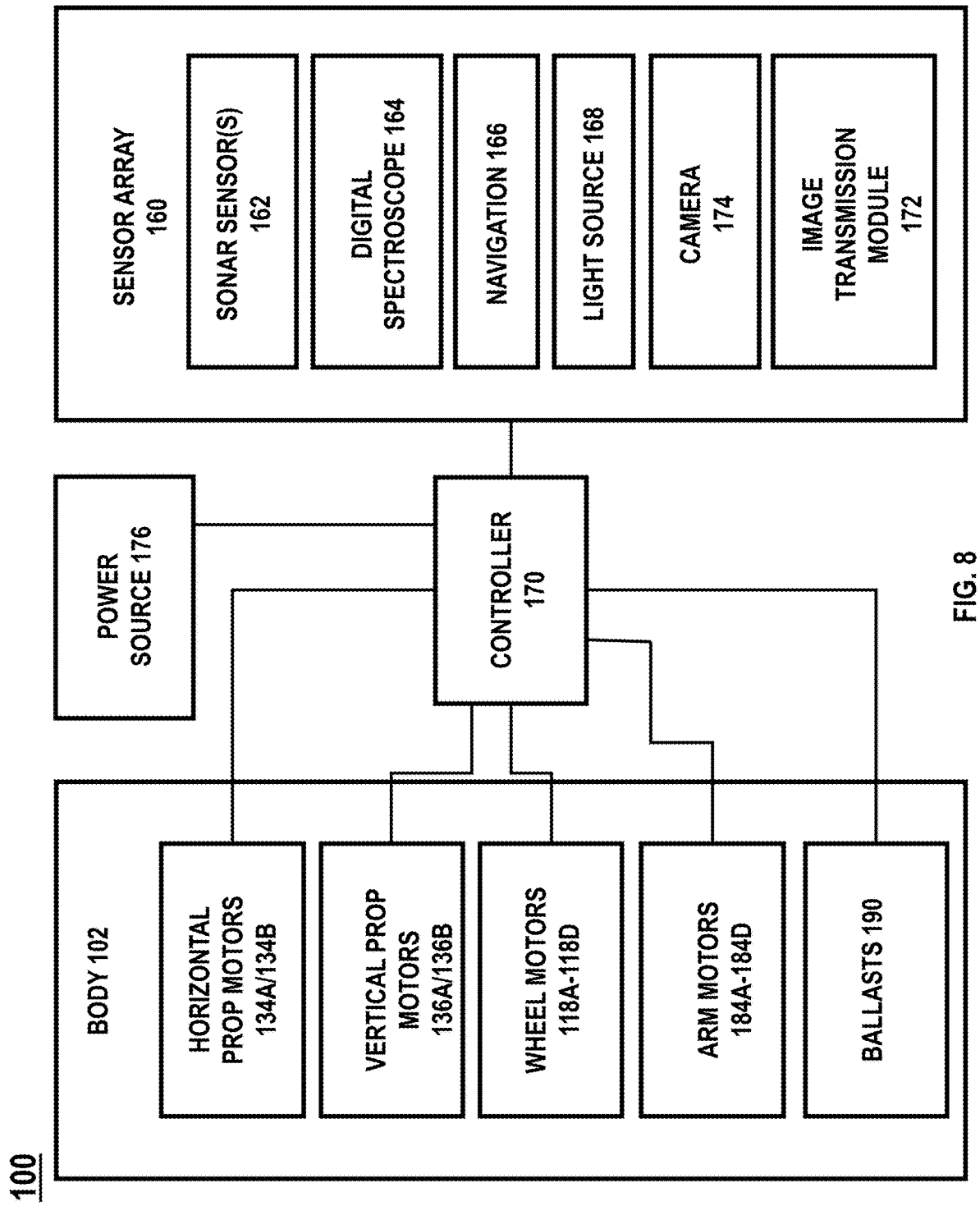
FIG. 8 is a diagram showing a controller and associated internal components of the amphibious submersible of FIG. 1.
Figure 9A:
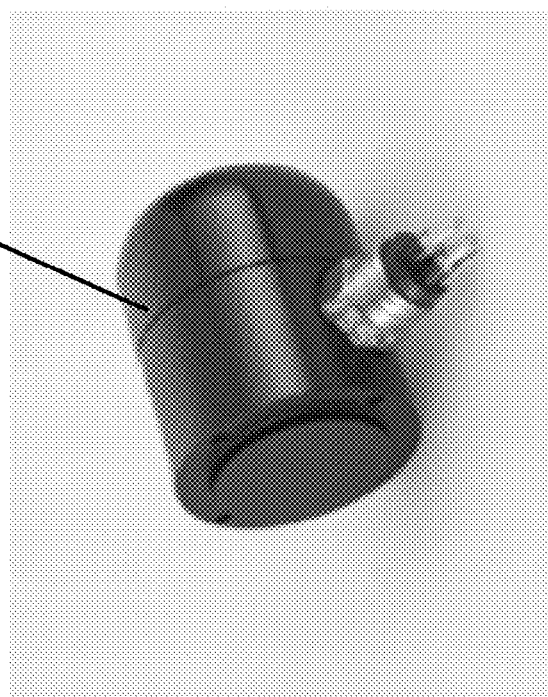
FIG. 9A is a photograph of an exemplary digital sonar imaging sensor included onboard the amphibious submersible of FIG. 1.
Figure 9B:
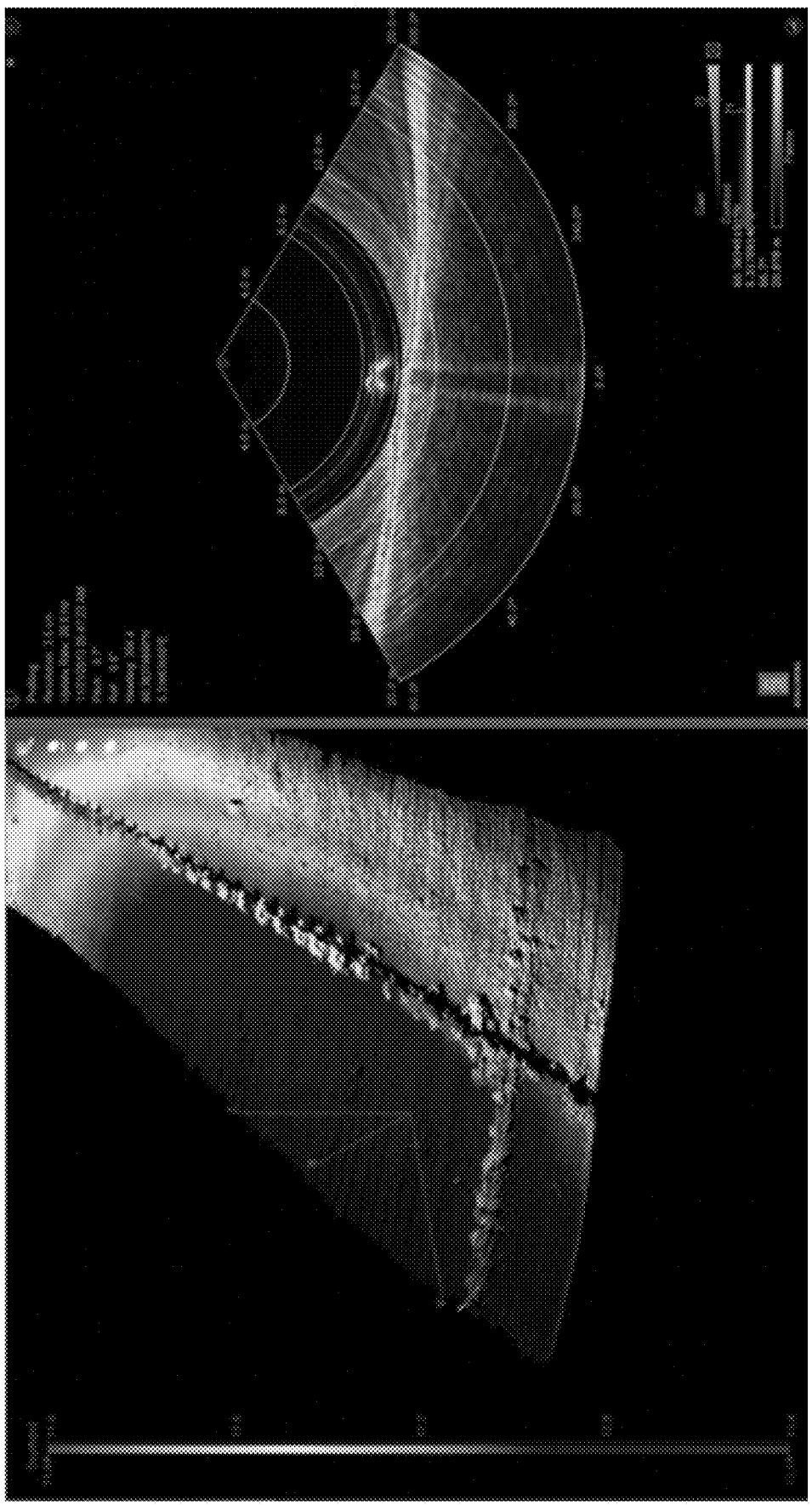
FIGS. 9B and 9C are screenshots of sonar images captured by the digital sonar imaging sensor of FIG. 9A.
Figure 9C:
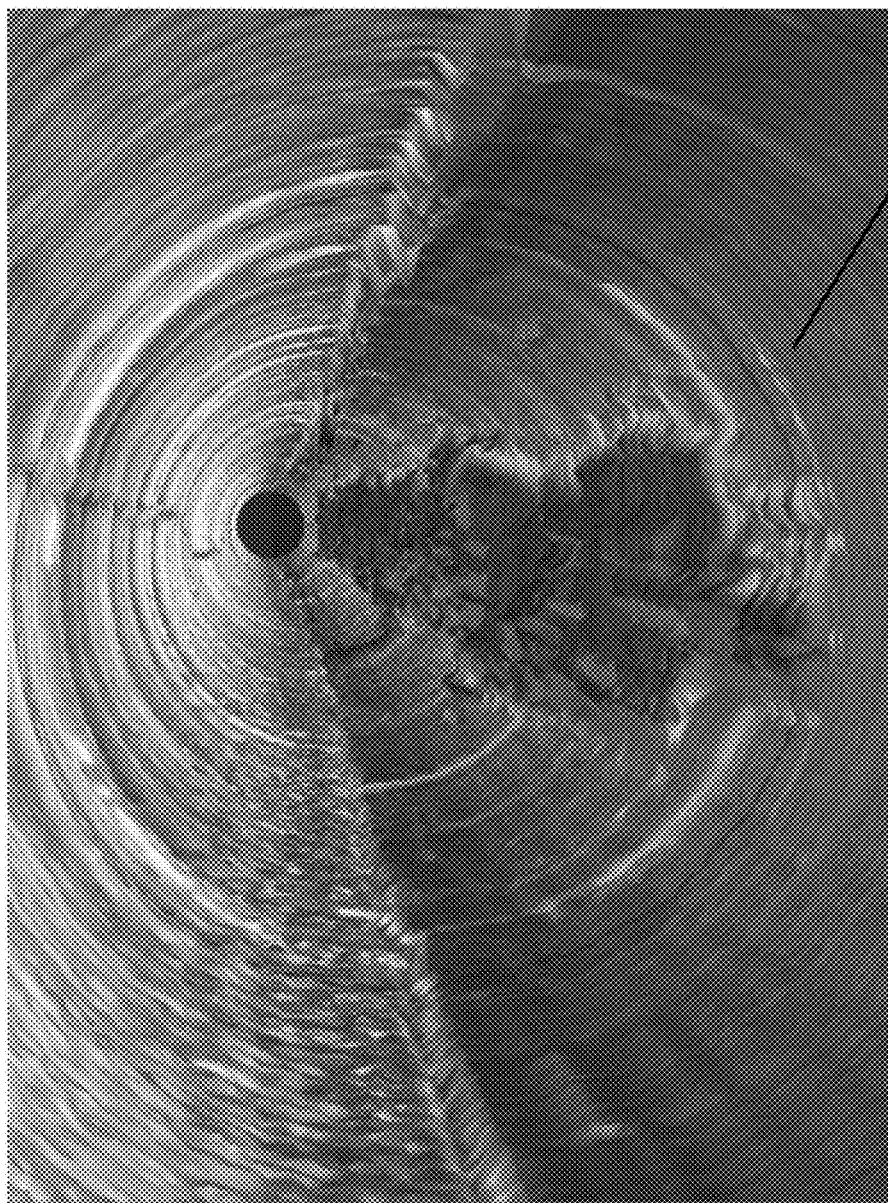

Referring to FIGS. 2 and 8, the controller 170 controls motors and other aspects of the vehicle 100. In particular, the controller 170 provides individual power and control to the horizontal propeller motors 134A and 134B, the vertical propeller motors 136A and 136B, wheel motors 118A-118D, robotic arm motors 184A-184D (discussed later herein in greater detail), and ballast system 190. Controller 170 can also facilitate communication with and provide power to the sensor array 160, including one or more sonar sensors 162, a spectroscope 164, one or more navigation sensors 166, one or more light sources 168, one or more cameras 174, and an associated image transmission module 172 for initial processing and transmission of images and other data obtained using the sensor array 160. In some embodiments, the controller 170 includes control hardware (not shown) onboard the vehicle 100, and in some embodiments, aspects of the controller 170 are provided via wired connection. In one particular embodiment, electronics associated with the controller 170 are stored onboard the vehicle 100; however, the controller 170 is externally controlled by a handheld controller such as a joystick. In some embodiments, power is provided to the controller 170 and vehicle 100 by wired connection from power source 176.

Sensors

For visual observation of the interior of the pipe 10, a sensor array 160 is installed on the vehicle 100. As shown in FIG. 1, at least one sensor of the sensor array 160 is mounted at a distal end of the robotic arm 140 of the vehicle 100. The robotic arm 140 includes an arm motor array 180 and associated arm members 184A and 184B which facilitate motion of the robotic arm 140 in 6 degrees of motion. In particular, in the embodiment shown, arm motors 182A and 182B are configured to provide two degrees of freedom to the first member 184A relative to the body 102 of the vehicle 100. Similarly, arm motors 182C and 182D are configured to provide two degrees of freedom to the second member 184B relative to the first member 184A, thereby enabling positioning of the sensor array 160 with three degrees of freedom.

In some embodiments, the plurality of sensors 160 further include the one or more sonar sensors 162, as shown in FIGS. 8 and 9A-9C. Using sonar sensors 162, cross-sectional views of the pipe 10 can be rapidly scanned for debris such that an operator can infer information concerning the walls of the pipe 10. The sonar sensor 162 is operable to generate 360 degree images at high speeds and resolutions, so that debris and even wall defects can be visualized regardless of water optical conditions.

Figure 10A:
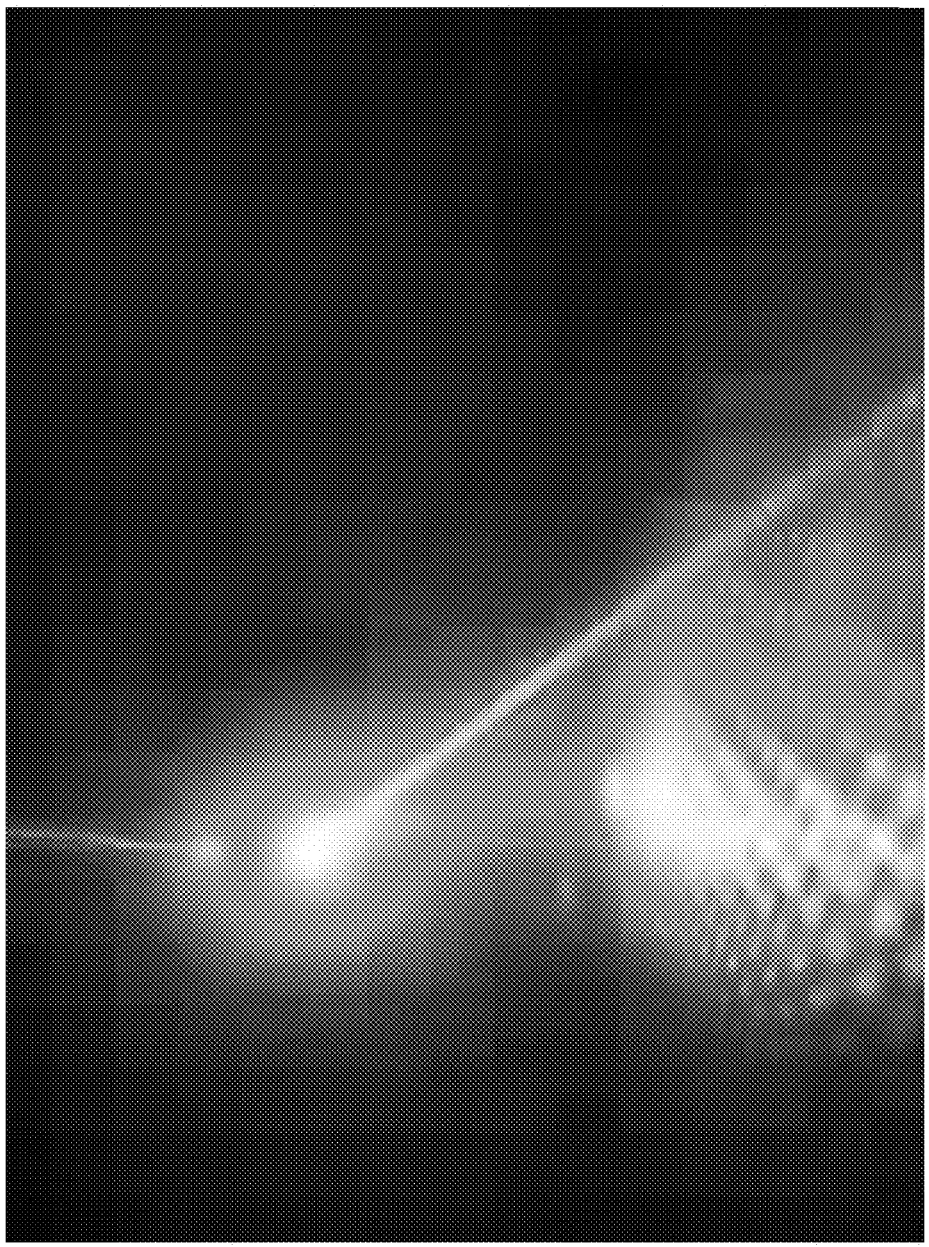
FIG. 10A is a photograph of underwater pipe scanning with a laser using the amphibious submersible of FIG. 1.
Figure 10B:
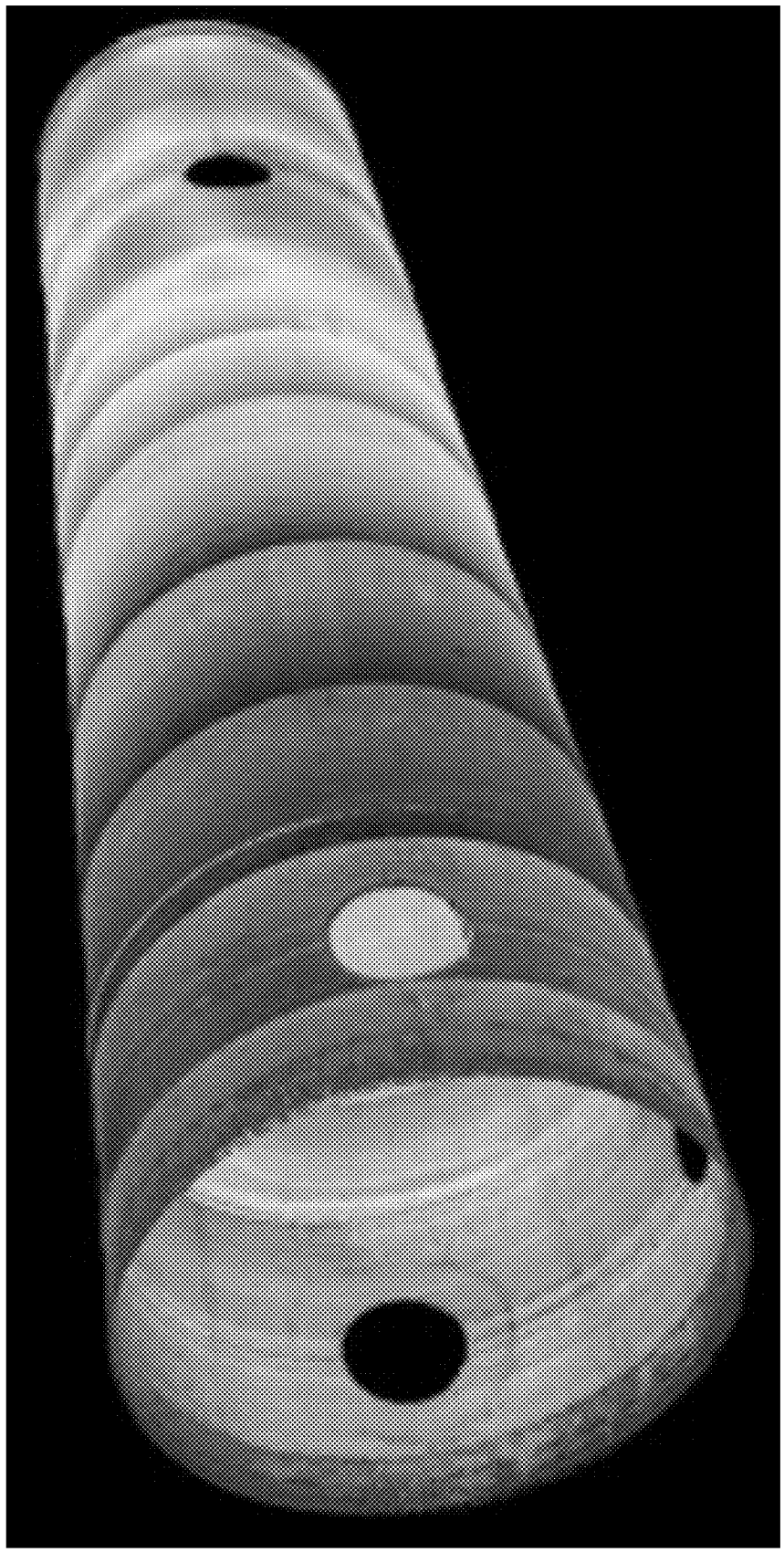
FIG. 10B is an image created by the pipe scanning procedure shown in FIG. 10A.
Figure 11:
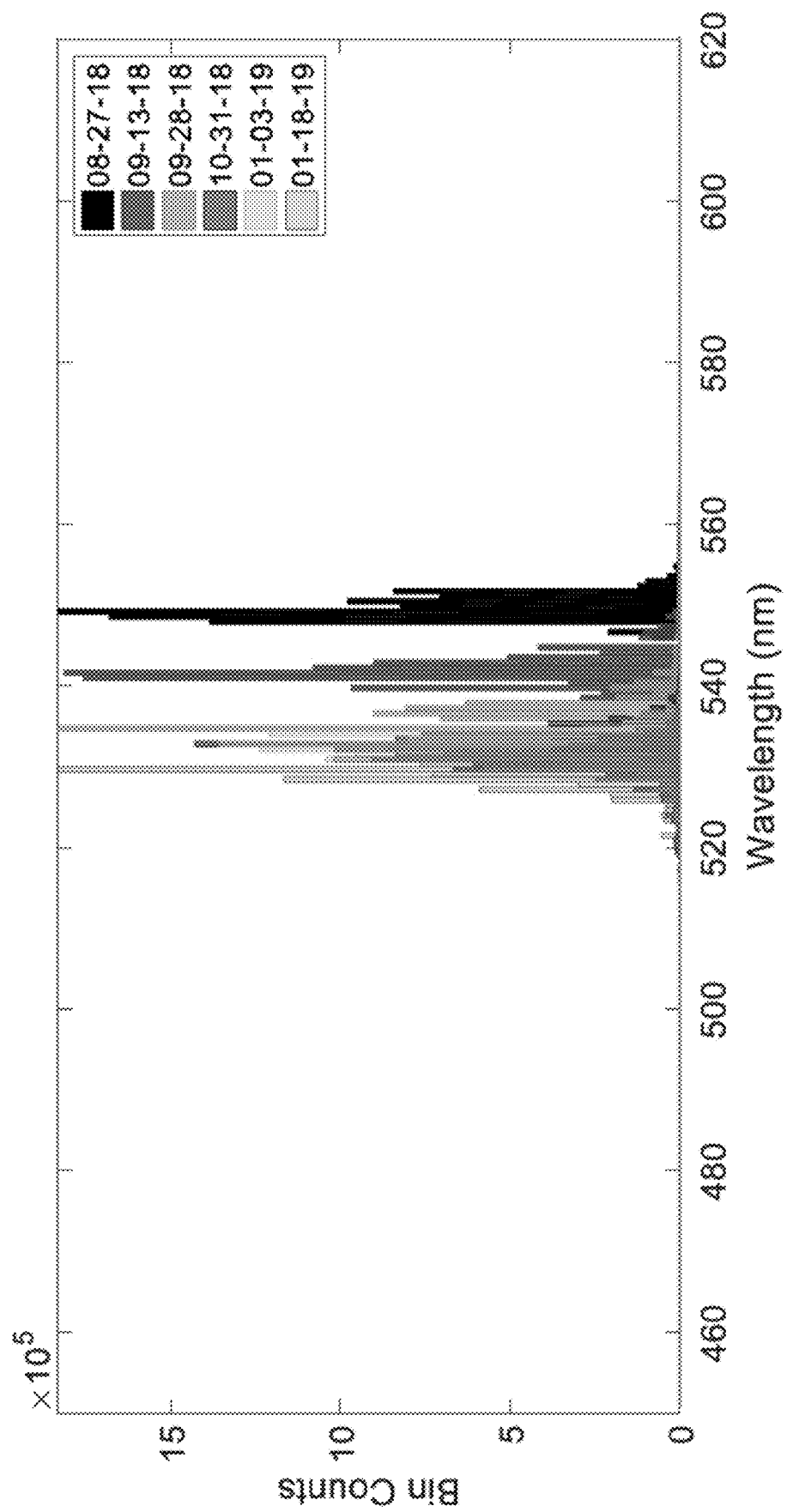
FIG. 11 is a graphical representation showing spectroscopy results taken of a pipe by the amphibious submersible of FIG. 1.

In some embodiments, the plurality of sensors 160 further includes the spectroscope 164 operable for obtaining spectral data from laser-illuminated surfaces as shown in FIGS. 10A-11. The spectroscope 164 is operable for scanning the walls of the pipe 10, and the reflectance can then be spectrally analyzed for pipe wall deposit and other surface conditions. Laser scanning can easily identify wall defects, due to its high resolution (<1 mm). Defects such de-bonded joints, wall erosion, and deposits can be detected.

Positioning of the vehicle 100 is an important task which is necessary to determine the location of any problem areas along the pipes 10. It has been found that Global Positioning System (GPS) does not work in this case because the underground nature of the environment blocks the GPS signal. Therefore, the vehicle 100 employs local positioning methods to navigate. Among possible options, the vehicle 100 uses an inertial measurement unit (IMU) 166 as a base sensor to measure the position of the vehicle 100. An IMU 166 is an electronic device that measures a body's specific force, angular rate, and sometimes the magnetic field surrounding the body. A major disadvantage of using IMUs is that they typically suffer from accumulated error. With the guidance system continually integrating acceleration with respect to time to calculate position and velocity, any measurement errors, are accumulated over time and leads to "drift". A Kalman filter (not shown) in combination with other positional tracking systems can be used to continually correct drift errors. In some embodiments, the plurality of sensors 160 include a compact underwater light source 168 mounted on the vehicle 100. In some embodiments, a camera 174 and image transmission/data recording module 172 are included on the vehicle 100 which are both compact and submersible.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A vehicle, comprising:
   an elongated body defining a first side, an opposite second side, a front side, and a rear side;
   one or more propellers and a plurality of wheels associated with the elongated body, the one or more propellers and the plurality of wheels being collectively operable for propelling the vehicle in at least one of a vertical direction and a horizontal direction; and
   a sensor array associated with the vehicle, wherein the sensor array is operable for imaging and navigation of the vehicle;
   wherein the one or more propellers include a vertically oriented propeller configured to propel the vehicle in the vertical direction, the vertically oriented propeller being associated with a respective vertically oriented propeller motor in operative communication with a controller.

2. The vehicle of claim 1, wherein the sensor array includes at least one of:
   one or more sonar sensors;
   a spectrometer; and
   one or more navigation sensors.

3. The vehicle of claim 1, wherein the one or more propellers includes a horizontally oriented propeller configured to propel the vehicle in the horizontal direction within a liquid surrounding the vehicle, the horizontally oriented propeller being associated with a respective horizontally oriented propeller motor in operative communication with the controller.

4. The vehicle of claim 1, wherein each wheel of the plurality of wheels is associated with a respective wheel motor of a plurality of wheel motors in operative communication with the controller such that each respective wheel motor is operable for rotation independent of one another.

5. The vehicle of claim 1, further comprising a ballast system, wherein the ballast system is operable for increasing or decreasing the buoyancy of the vehicle relative to an external environment of the vehicle.

6. The vehicle of claim 1, wherein one or more sensors of the sensor array are positioned along a robotic arm extending from the elongated body and wherein the robotic arm is operable for motion along six degrees of freedom.

7. A vehicle, comprising:
   an elongated body defining a first side, an opposite second side, a front side, and a rear side;
   one or more propellers and a plurality of wheels associated with the elongated body, the one or more propellers and the plurality of wheels being collectively operable for propelling the vehicle in at least one of a vertical direction and a horizontal direction, wherein each wheel of the plurality of wheels includes a plurality of spokes, wherein at least two spokes of the plurality of spokes are coupled at a rocker and wherein the rocker includes at least one claw; and
   a sensor array associated with the vehicle, wherein the sensor array is operable for imaging and navigation of the vehicle.

8. The vehicle of claim 7, wherein the sensor array includes at least one of:
   one or more sonar sensors;
   a spectrometer; and
   one or more navigation sensors.

9. The vehicle of claim 7, wherein the one or more propellers includes a vertically oriented propeller configured to propel the vehicle in the vertical direction within a liquid surrounding the vehicle, the vertically oriented propeller being associated with a respective vertically oriented propeller motor in operative communication with a controller.

10. The vehicle of claim 7, wherein the one or more propellers includes a horizontally oriented propeller configured to propel the vehicle in the horizontal direction within a liquid surrounding the vehicle, the horizontally oriented propeller being associated with a respective horizontally oriented propeller motor in operative communication with a controller.

11. The vehicle of claim 7, wherein each wheel of the plurality of wheels is associated with a respective wheel motor of a plurality of wheel motors in operative communication with a controller such that each respective wheel motor is operable for rotation independent of one another.

12. The vehicle of claim 7, further comprising a ballast system, wherein the ballast system is operable for increasing or decreasing the buoyancy of the vehicle relative to an external environment of the vehicle.

13. The vehicle of claim 7, wherein one or more sensors of the sensor array are positioned along a robotic arm extending from the elongated body and wherein the robotic arm is operable for motion along six degrees of freedom.

14. A method for maneuvering a vehicle within a pipe, comprising:
   providing a vehicle, comprising:
      an elongated body defining a first side, an opposite second side, a front side, and a rear side;
      one or more propellers and a plurality of wheels associated with the elongated body, the one or more propellers and the plurality of wheels being collectively operable for propelling the vehicle in at least one of a vertical direction and a horizontal direction;
      a sensor array associated with the vehicle, wherein the sensor array is operable for imaging and navigation of the vehicle;
   actuating at least one of the one or more propellers and the plurality of wheels resulting in propulsion of the vehicle in at least one of a horizontal direction and a vertical direction;
   generating a spectral image of an interior of a pipe by a spectroscope of the sensor array; and
   generating a sonar image of an interior of a pipe by one or more sonar sensors of the sensor array.

15. The method of claim 14, further comprising:
   actuating a vertically oriented propeller of the one or more propellers resulting in propulsion of the vehicle in the vertical direction.

16. The method of claim 14, further comprising:
   actuating a horizontally oriented propeller of the one or more propellers resulting in propulsion of the vehicle in the horizontal direction.

17. The method of claim 14, further comprising:
   activating one or more pumps of a ballast system of the vehicle resulting in an increase in buoyancy or a decrease in buoyancy of the vehicle.

18. The method of claim 14, further comprising:
   orienting the sensor array in 3-dimensional space by actuating one or more arm motors associated with a robotic arm of the vehicle, wherein the sensor array is located at a distal end of the robotic arm.

19. The method of claim 14, further comprising:
   actuating the one or more wheels when a collective force generated by one or more horizontally oriented propellers of the one or more propellers is insufficient to overcome one or more obstacles within an external environment of the vehicle.

\* \* \* \* \*